US012392636B2

(12) United States Patent
Puig Adamuz et al.

(10) Patent No.: US 12,392,636 B2
(45) Date of Patent: Aug. 19, 2025

(54) METHOD AND SYSTEM OF DETECTING OBSTACLE ELEMENTS WITH A VISUAL AID DEVICE

(71) Applicant: BIEL GLASSES, S.L., Barcelona (ES)

(72) Inventors: Jaume Puig Adamuz, Barcelona (ES); Alex Cabañeros López, Barcelona (ES); Antonio Sanz Montemayor, Alcorcón (ES); Francisco José García Espinosa, Fuenlabrada (ES); Maria Constanza Lucero, Barcelona (ES)

(73) Assignee: BIEL GLASSES, S.L., Barcelona (ES)

( * ) Notice: Subject to any disclaimer, the term of this patent is extended or adjusted under 35 U.S.C. 154(b) by 204 days.

(21) Appl. No.: 18/010,425

(22) PCT Filed: Jul. 7, 2021

(86) PCT No.: PCT/EP2021/068877
§ 371 (c)(1),
(2) Date: Dec. 14, 2022

(87) PCT Pub. No.: WO2022/008612
PCT Pub. Date: Jan. 13, 2022

(65) Prior Publication Data
US 2023/0296405 A1  Sep. 21, 2023

(30) Foreign Application Priority Data
Jul. 7, 2020 (EP) .................................. 20382609

(51) Int. Cl.
*G06T 7/11* (2017.01)
*G01C 21/00* (2006.01)
(Continued)

(52) U.S. Cl.
CPC ..... *G01C 21/3826* (2020.08); *G01C 21/3848* (2020.08); *G06F 1/163* (2013.01);
(Continued)

(58) Field of Classification Search
CPC ... G06T 7/11; G06T 7/593; G06T 7/70; G06T 11/00; G06T 17/05; G06T 2207/10012;
(Continued)

(56) References Cited

U.S. PATENT DOCUMENTS 10,984,545 B2 *  4/2021  Gu .......................... G06N 20/10
2005/0162512 A1   7/2005  Seakins
(Continued)

FOREIGN PATENT DOCUMENTS

FR   3036614 A1      12/2016
WO   WO2013173898 A2 11/2013
WO   WO2019094705 A1  5/2019

OTHER PUBLICATIONS

International Search Report and Written Opinion of the International Searching Authority. International Application No. PCT/EP2021/068877 issued by the European Patent Office, mail date Oct. 1, 2021, 16 pages, Rijswijk, NL.
(Continued)

*Primary Examiner* — Antonio A Caschera
(74) *Attorney, Agent, or Firm* — Peter B Scull (57) ABSTRACT

Detecting obstacle elements, the detection performed with a visual aid device, the device including a distance sensor, the sensor being mounted in a wearable device to be worn by a user. Several embodiments allow the further detection of different types of obstacles, in order to map and signal them to a user with low-vision.

20 Claims, 6 Drawing Sheets

(51) Int. Cl.
*G06F 1/16* (2006.01)
*G06T 7/593* (2017.01)
*G06T 7/70* (2017.01)
*G06T 11/00* (2006.01)
*G06T 17/05* (2011.01)
*G06V 10/764* (2022.01)
*G08B 21/02* (2006.01)

(52) U.S. Cl.
CPC ............ *G06T 7/11* (2017.01); *G06T 7/593* (2017.01); *G06T 7/70* (2017.01); *G06T 11/00* (2013.01); *G06T 17/05* (2013.01); *G06V 10/764* (2022.01); *G08B 21/02* (2013.01); *G06T 2207/10012* (2013.01); *G06T 2207/10024* (2013.01); *G06T 2207/10028* (2013.01); *G06T 2207/30244* (2013.01)

(58) Field of Classification Search
CPC ........... G06T 2207/10024; G06T 2207/10028; G01C 21/3826

See application file for complete search history.

(56) References Cited

U.S. PATENT DOCUMENTS

| | | |
|---|---|---|
| 2008/0247620 A1 | 10/2008 | Lewis et al. |
| 2013/0131985 A1 | 5/2013 | Weiland et al. |
| 2013/0250078 A1 | 9/2013 | Levy |
| 2015/0145985 A1* | 5/2015 | Gourlay .................. G06T 17/00 348/135 |
| 2018/0075302 A1 | 3/2018 | Udell et al. |
| 2018/0125716 A1 | 5/2018 | Cho et al. |
| 2018/0189567 A1 | 7/2018 | Maheriya et al. |
| 2019/0121168 A1 | 4/2019 | Greget |
| 2020/0065584 A1* | 2/2020 | Iyer ........................... G06T 7/70 |
| 2021/0183083 A1* | 6/2021 | Yan ........................... G06T 5/70 |

OTHER PUBLICATIONS

Labayrad, et al: "Real Time Obstacle EP Detection in Stereovision on Non Flat Road Geometry Through V-disparity Representation", IEEE Xplore, Mar. 26, 2003 (Mar. 26, 2003), pp. 646-651, New York City, NY, XP055761112, Retrieved from the Internet: URL:https://ieeexplore.ieee.org/stampPDF/getPDF.jsp?tp=&arnumber=1188024&ref=aHROcHM6Ly9pZWVleHBsb3JlLmllZWUub3JnL2Fic3RyYWNOL2RvY3VtZW50LzExODgwMjQ=tp [retrieved on Dec. 17 2020] section 111.

* cited by examiner

METHOD AND SYSTEM OF DETECTING OBSTACLE ELEMENTS WITH A VISUAL AID DEVICE

The present application claims the benefit of European application no. EP 20382609.4 filed on 7 Jul. 2020.

BACKGROUND ART

Low Vision is a visual disability that often prevents people from carrying out everyday activities. There are different causes that provoke Low Vision, such as, for example, Diabetic retinopathy, Pigmentary Retinosis or Glaucoma. Any of these or other similar or related diseases provoking Low vision may have effects on the vision of the user that appear alone or in combination. For example, reduction of the visual field can specifically affect central vision, peripheral vision (in the case of Glaucoma), half of the vision (in the case of Hemianopsia caused by brain trauma) or randomly distributed patches (in case of diabetic retinopathy), among others. Furthermore, reduced visual acuity involves blurred vision, caused by macular degeneration and amblyopia. Reduced contrast and brightness also occur in the case of albinism, glaucoma and diabetic retinopathy, and loss of stereopsis (depth perception) may also be associated with many different diseases that cause low vision.

Such effects may cause difficulties to the patient when, for example, recognizing objects, people or spatial features (such as, for example, boundaries of a room), or also when reading or watching TV. Furthermore, they may involve mobility problems, limiting the autonomy of the person with low vision, as they often cannot walk or travel alone.

Different visual aid devices are used to help the patient recognizing different elements surrounding himself, in order to help him when moving around an unknown environment. Examples of such devices may be, for example, ultrasound-based canes or proximity detectors, which detect the position of obstacles surrounding the user. However, said systems may not be sufficiently accurate, and they may generate too many false detections. Therefore, in view of the existing systems, there is a need for a more accurate and versatile system and method for detecting obstacles for such patients.

SUMMARY

According to an aspect of the present disclosure, a method of detecting obstacle elements with a visual aid device is presented, the device comprising a distance sensor, the sensor being mounted in a wearable device to be worn by a user, the method comprising the steps of:
  obtaining a normal map from the distance sensor;
  determining the orientation of the coordinate system of the distance sensor relative to the world coordinate system;
  applying an orientation correction to the normal map based on the determined orientation, the orientation correction comprising transforming the coordinate system of the distance sensor into the world coordinate system;
  comparing the corrected normal map with at least one predetermined normal threshold; and
  based on the comparison, segmenting a portion of the normal map as a lateral wall zone, a floor zone or an obstacle zone.

According to the present disclosure, the distance sensor obtains a normal map. The obtaining of the normal map may be performed by using a plurality of known techniques which may vary depending on the distance sensor used. It may be obtained by previously obtaining a depth map using, for example, with a Modulated light scanner based sensor. Otherwise, it may also be obtained by obtaining a point cloud of the scene using, for example, a LI DAR sensor, which may be subsequently used to obtain the normal map. Alternatively, a normal map could also be obtained by using a plurality of RGB images of the scene captured from different positions.

In the case that the normal map is obtained from a depth map, the obtaining of the normal map may be performed for at least one pixel of the depth map, but in order to obtain more information about the target surface the distance sensor, a normal map may be calculated for a plurality or all the pixels of the depth map, hence improving the efficiency of the overall method. This way, an accurate information about the shape of the surfaces represented in the depth map is obtained.

There are different types of distance sensors which may be used to perform the method according to the present disclosure, which could be, for example:
  ToF (Time of Flight) based sensors: a laser beam is sent to the target and the time elapse in between the sending and the receiving of the bounced beam is measured. This way, by having the speed of light and the time of arrival of the beam, distance can be measured. Examples of these type of sensors may be ultrasound sensors (which are versatile and cost-effective, but with a short range and precision), infrared sensors (which are precise and can work under low light conditions, but have a short range and may not work effectively with a large amount of solar light), LIDAR sensors (which are precise and fast and have a long range, but very directional, with a high cost and have a small vertical visual field), or a ToF camera (which is a simple and precise device, but has a small horizontal visual field, is very sensible to other sources of light and reflective surfaces, and may be a heavy and expensive piece of equipment).
  Modulated light scanner based sensors: They are similar to ToF sensors. In this case a modulated light signal is sent to the target and the difference in between the sent signal and the received signal (which has bounced on the target) is calculated, in order to obtain the distance to the target.
  Stereoscopic vision based sensors: A minimum of two cameras is used in order to calculate the distance to a target. This way, two digital images of the target are obtained and a plurality of matching points is determined in between the two images. Afterwards, the difference in the position in between matching points (the same points of the target depicted in different images), and a calculation of the distance to the point of the target is performed. An example of such sensors may be an stereoscopic camera, which captures both an RGB type image and the corresponding depth map. Usually, this type of cameras has a long range and good performance in exteriors, with daylight. Furthermore, they detect holes and steps of stairs. However, they are less precise than ToF sensors, have problems in dimly light environments, and the size of the sensor is conditioned by the fact that the two or more lenses reproduce human binocular vision, and thus the distance between the lenses of the two cameras approximates that of the distance between the eyes of a human being.

Structured light scanners: In this case, a laser beam with a predetermined pattern is sent, and by means of a receiver, the distortion caused by the bouncing of the beam on the target is measured, in order to calculate the distance to said target. An example of this sensor may be an RGB-D camera, which comprises an infrared emitter and an infrared camera all in one. This type of sensors are precise, capable of working with low illumination, and work in a synchronised way with a video image, at a high speed and frame-rate, although is has a short range and it may be ineffective with solar light.

A normal map may be a digital image, wherein for at least one pixel (normally all of them), the normal map comprises a surface normal parameter, which may be a parameter related to a direction normal to the surface at the point of the target depicted by said pixel. More specifically, the surface normal parameter may be a vector perpendicular to the tangent plane of the surface at the point of the target represented by the corresponding pixel. In this case, the surface normal parameter may be represented by a normal vector with (x,y,z) components.

According to a specific example of the present disclosure, the normal map may comprise a normal vector for each pixel of the normal map, and more specifically, it may also be a unitary vector perpendicular to the tangent plane of the surface at the point of the target represented by the corresponding pixel of the normal map.

The distance sensor may be comprised in the visual aid device, which may be mounted on top of a wearable device, such as, for example, a set of glasses, a helmet, a set of headphones, an earpiece such a mobile phone earpiece, or other devices to be worn on the head. Therefore, according to one example, the display of the visual aid device (which may be, for example, a set of display glasses) and the sensor mounted on the wearable device may be directed in a plane substantially perpendicular to the coronal plane of the user. The distance sensor may point in the same direction (or almost the same) as the display of the visual aid device, thus approximating the frontal vision of the user. This way, the sensor may obtain normal maps from the frontal visual field of the user.

Furthermore, while using the visual aid device, the user may incline or rotate his head in such a way that the sensor may end up obtaining, over time, different normal maps pointing to different directions. Hence, because of the user inclining his head up and/or down, the sensor may obtain normal maps which depict common elements of the environment of the user, but from different points of view.

For example, if a user wearing the visual aid device walks normally on his two feet, looking forward, a normal map obtained by the device may see at the bottom of the normal map, a portion corresponding to the floor, which may be segmented as a floor zone. Then, if the user inclines his head downwards, looking towards his feet (i.e. orienting the distance sensor of the device towards his feet), the obtained normal map may comprise a plurality of surface normal parameters which point to the normal direction of the surface viewed by the sensor. Therefore, the user may be looking towards the floor, and the obtained normal map may have a portion corresponding to the floor, but whose surface normal parameters point perpendicularly to the normal map itself. Thus, the target floor would be segmented as a floor zone when the user looks forward, and as an obstacle (facing frontally to the user) when the user looks towards his feet.

This contradiction is due to the fact that the distance sensor has a coordinate system, but when the distance sensor is moved (i.e. the user moves his head), a transformation of its coordinate system is performed. Therefore, in order to avoid said contradiction in between different images when the user moves his head, said transformation may be corrected. This way, said portion of the normal map may be segmented as a floor zone, regardless of the inclination of the head of the user, since its surface parameters correspond, in reality, to targets located on the floor.

In order to avoid false classifications of pixels caused by the orientation of the sensor when the user moves his head up or down (such as in the example mentioned above), a common coordinate system may be used for all the obtained normal maps. This may be achieved by determining the orientation of the coordinate system of the distance sensor relative to the world coordinate system, and subsequently applying an orientation correction to the obtained normal map based on the determined orientation, the orientation correction comprising transforming the coordinate system of the distance sensor into the world coordinate system.

In geometry and kinematics, coordinate systems are used to describe the (linear) position of points and the angular position of axes, planes, and rigid bodies. In the latter case, the orientation of a second (typically referred to as "local") coordinate system, fixed to a node, may be defined based on the first (typically referred to as "global" or "world" coordinate system). Therefore, according to the present disclosure, the distance sensor may be the node, and its coordinate system may be considered the "local" coordinate system. Since the local coordinate system of the sensor may change over time (due to movement of the head of the user), a correction of the orientation of the local coordinate system relative to the world coordinate system (which is fixed) may be performed over time.

This way, even though different normal maps may capture the same element with different normal parameters (i.e. with different corresponding transformations of the local coordinate system), an obstacle may be defined according to the same frame of reference (i.e., in this case, the world coordinate system). Therefore, any obstacle may be detected regardless of the user inclining his head (i.e., an inclination of the sensor), such detection being ultimately made relative to a common and fix coordinate system.

This way, following a similar example, a first normal map may be obtained wherein part of the map corresponding to a target floor may be segmented as floor because of the inclination of the user's head (the user not inclining his head), and a second normal map may be obtained wherein, due the user inclining his head and looking downwards, the same part of the map corresponding to the target floor may be segmented as a frontal obstacle. However, when the orientation correction is performed, the same target floor may be segmented as floor both in the first and second normal maps, thus avoiding false classifications of pixels corresponding to targets found in the surroundings of the user.

By using the present method, a classification of surface normal parameters (found in each pixel of a normal map) is performed, labelling each pixel of the map as a type of zone. Such classification of parameters of the normal map may result in a segmentation of the normal map, wherein several zones are defined in the map, each zone corresponding to a type of zone, such as a floor zone, an obstacle zone or a lateral wall zone. Furthermore, a segmentation of a portion of a normal map means that a type of obstacle is detected, the obstacle being the target corresponding to said portion of the normal map.

Therefore, the resulting segmentation of a captured normal map by a visual aid device allows detecting different obstacles in a robust way, and does not depend on the inclination of the head of the user, thus being more reliable.

More specifically, according to a further example, the determining of the orientation of the coordinate system of the distance sensor may be performed by obtaining at least the pitch component of the coordinate system of the distance sensor relative to the world coordinate system. Such component may be enough to further perform a segmentation of a group of pixels of a normal map in order to detect obstacles, since the other components can be ignored while still correctly detecting several types of obstacles. Additionally, the yaw and roll components may also be used for a better and more accurate detection in some specific cases. Furthermore, at least the pitch component may be obtained over time by using one or more of a gyroscope, magnetometer and an accelerometer.

The sensor orientation (where the coordinate system of the sensor is relative to the world coordinate system) may be obtained by using an accelerometer, which calculates the components of the gravity vector. Thus, by calculating the gravity vector, the pitch and roll components of the Euler angles of such orientation may be obtained.

According to the present disclosure, the pitch component may be enough to calculate the orientation correction, since a roll or yaw component does not affect the detection performed in the present method. Therefore, the user inclining his head up and/or down may be sufficiently relevant to perform an orientation correction on the obtained normal maps.

More specifically, according to a further example, an IMU sensor may be used to obtain the transformation of the coordinate system of the distance sensor. An IMU sensor is an electronic device used to calculate and report an exact force of body, angular rate as well as the direction of a body, which can be achieved by using a blend of 3 sensors like a Gyroscope, a Magnetometer, and an Accelerometer. In summary, IMUs combine the three apparatus, thus obtaining the orientation of the camera both static and in movement, relative to the world coordinate system, from which the pitch component of the coordinate system is enough to perform the orientation correction according to the present disclosure.

Alternatively, visual odometry may be used to obtain a distance sensor orientation correction, although it may need a specific type of distance sensor, which comprises a sensor for obtaining images. In this case, pitch may be calculated by determining the position and orientation of the sensor by analyzing the different images captured while the sensor moves. Therefore, by observing the different images obtained while the sensor is in different positions, the movement of the sensor may be determined, and thus the orientation thereof. Visual odometry is used in a wide variety of robotic applications, such as on the Mars Exploration Rovers.

Combinations thereof may also be used, wherein an IMU refines its output data by using a further device based on visual odometry in parallel, combining the data of both devices in order to obtain the transformation of the coordinate system of the distance sensor.

According to an example of the present disclosure, the orientation correction may be a rotation matrix for the normal map. In this example, an obtained normal map may be in the form of a matrix of surface normal parameters (for example, a matrix of normal vectors), and by transforming the normal map matrix with the rotation matrix, an orientation correction of the normal parameters found within the normal map may be achieved.

After the correction, a comparison of the corrected normal map may be performed, with at least one predetermined normal threshold. Such comparison may be performed by comparing one or more of the surface normal parameters comprised in the normal map, with one or more predetermined normal thresholds, which may correspond to different ranges of surface normal parameters. If a surface normal parameter is within a certain range (defined by a normal threshold, related to a type of zone in reality), this may indicate that it has certain features that make the surface normal parameter most likely be a type of zone or another one.

In an example, the normal map may be a matrix of normal vectors, each normal vector corresponding to each pixel of the normal map, which define the shape of the surface of the target depicted in the normal map. Also, according to another example, the normal thresholds may be a range of possible normal vectors which may represent a type of obstacle (i.e. a predetermined zone), the normal vectors arranged in a corresponding normal vector matrix. This way, a classification of one or more pixels may be performed based on a comparison of a surface normal parameter with a threshold corresponding to a predetermined zone which may define lateral walls. Furthermore, other normal thresholds may correspond to zones which may define the floor where the user walks, or other type of obstacles which may be frontal to the user.

According to an example of the present disclosure, the method may also segment the normal map as lateral walls (surfaces which are substantially perpendicular to the floor where the user is walking), floor zones (surfaces with normals substantially parallel to a gravity vector) or obstacle zones (surfaces substantially perpendicular to the floor where the user is walking, and perpendicular to the movement of the user) and may leave, for example, an undetermined segmentations for zones which don't match enough criteria of any of the preceding segmentations.

All predetermined zones may be configured according to the user's considerations, depending on the user's mobility, level of low vision, etc. For example, a user may consider only lateral walls of a certain inclination to be lateral walls, and therefore a lateral wall zone may be predetermined with a certain normal threshold according to the user's consideration. Thus, the different zones can be configured taking into account the preferences of the user.

Alternatively, the normal thresholds may also be previously determined by studying the normal vectors of several types of lateral walls, floors or obstacles. This way, it is possible to further segment a part of a normal map based on the surface normal parameters, recognizing that part of the map as a lateral wall, a floor or an object.

By performing the method previously described, it is possible to segment different zones of a target area based on a normal map captured by a distance sensor comprised in a visual aid, the sensor mounted on a wearable device worn by a user which, for example, may be visually impaired. Such segmentation of the normal map may be more effective than other visual aid systems aimed for people with low vision, since the segmentation may be less affected by, for example, errors introduced by the user moving his head while walking, thus correcting such movements while performing the segmentation, and detecting obstacle targets found in the sensed normal maps by segmenting portions of the normal map as lateral wall zones, floor zones or obstacle zones in a more efficient way.

According to another example, the distance sensor may obtain a depth map formed by a plurality of pixels, each pixel comprising a depth parameter, and the method may further comprise the steps of:
  selecting a lower portion of the obtained depth map;
  dividing the selected portion of the depth map into a plurality of horizontal lines;
  assigning a top depth threshold to the pixels of the top end line, and a bottom depth threshold to the pixels of the bottom end line, the top depth threshold being higher than the bottom depth threshold;
  assigning a depth threshold for the pixels of each line between the top and bottom end lines, wherein each depth threshold is lower than the depth threshold of the previous line, from the top towards the bottom line.
  comparing the depth parameter of each pixel with the assigned depth threshold of its corresponding horizontal line; and
  based on the comparison, further determining a negative obstacle zone in the pixels of the depth map wherein the depth parameter of the pixel is higher than the assigned depth threshold of the pixel.

The obtaining of the depth image may be performed by using the distance sensor which, according to the present disclosure, may be a sensor which may generate a depth map (i.e. a 2D data matrix or digital image) comprising the depth parameter of each point of a target scene in the corresponding pixel of the depth map. The depth parameter of each pixel may be defined by the physical distance from the plane of the distance sensor to each point of the target scene depicted in the depth map, for each corresponding pixel of the depth map. The distance sensor may comprise a capturing device from which the depth map is taken, and, more specifically, the plane of the sensor may be further defined as the plane perpendicular to the directional axis of the sensor (for example, in the case of a sensor being a camera, the plane would be perpendicular to the optical axis of the camera), and tangential to a reference point of said axis.

Therefore, the resulting depth map may have pixel values that correspond to the depth from a point of the plane of the sensor to the target surface depicted in the depth map. This way, the pixel of the centre of the depth map comprises a depth parameter which is equal to the physical distance from the centre of the distance sensor to the target depicted in the depth map. The rest of the pixels of the depth map have a depth parameter equal to the minimum physical distance from the plane of the distance sensor to the target depicted in said pixel of the depth map. Also, depending on its calibration, the pixel values can be given directly in physical units, such as, for example, meters.

The selection of a lower portion of the obtained depth map is performed as a first approximation of where the floor may usually be for a user. Depending on the user's height and/or the orientation of the distance sensor (i.e. the inclination of the head of the user), the lower portion may be bigger or smaller, but the method assumes that the user would be standing or walking on a floor which is in a substantially lower part of the depth map. Therefore, from a certain level of the depth map and above, it wouldn't be statistically logical to consider the upper part of the depth map as a possible target floor (it may be considered, for example, a target lateral wall).

The selected portion may be then divided into a plurality of lines. The number of horizontal lines (i.e. number of divisions) may vary depending on the accuracy needed when performing the method.

Furthermore, depth thresholds may be assigned to all the lines of the selected portion of the depth map, the thresholds descending gradually from the top to the bottom line.

Such assignment of depth threshold values takes into account that the upper lines of the portion of the depth map represent a possible target floor that is further away from the user than the lines at the bottom of the portion of the depth map, thus assigning higher depth threshold values to lines corresponding to lines representing targets (i.e., where the floor should be) that are supposedly more far away (thus should have a higher depth parameter in the depth map).

After assigning depth thresholds to each line of the selected portion of the depth map, a comparison may be performed between the assigned threshold of each line and the actual depth parameter of each pixel of the corresponding line.

This way, if a depth parameter of a pixel of the depth map is higher than its assigned threshold (wherein the threshold represents the depth parameter of the pixel if the target floor is flat and there were no holes or lowering of the floor level), this may be interpreted as the target being a negative obstacle (such as a lowering of the floor level, a hole, etc.), thus being detected as an obstacle wherein the user may, for example, fall into.

According to another example, the assigning of the depth threshold for each line between the top and bottom end lines may be performed by assigning the values of a predetermined mathematical function, between the top and bottom depth threshold values. Furthermore, according to another example, the predetermined mathematical function may be determined using the height of the user and the pitch component of the coordinate system of the distance sensor relative to the world coordinate system.

More specifically, the mathematical function is used to estimate the values of the depth parameters corresponding to an expected flat floor, such values being used as depth thresholds. Therefore, when using these estimated depth parameters as depth thresholds, the method assumes that the floor may be flat, and wherever the obtained depth parameters of the obtained depth map are higher than the depth thresholds, it is assumed that the floor is not flat in those pixels, and the depth found in the target is higher, thus a further segmentation of the previously detected floor zone may be obtained, wherein the pixels with a depth higher than the depth threshold are segmented as a negative obstacle (such as a hole or a lowering in the level of the floor).

Such example of the method of detecting obstacles, resulting in a determination of a negative obstacle zone, may be performed in combination or independently to the previously described method of detecting obstacles resulting in the segmentation of a portion of the normal map. When only performing the method of detecting obstacles which results in the determination of a negative obstacle zone, only a zone with negative obstacles may be determined. However, if used in combination with the method for detecting obstacles resulting in the segmentation of a portion of the normal map, a more accurate overall detection of obstacles may be obtained. Such overall detection may include a combination of zones of a normal map corresponding to targets which may be lateral walls, floors or other type of obstacles, wherein the determined floor zone may also comprise information about negative obstacles. Therefore, the floor zone may be more accurate when combining the information of the determined floor zone with the determined negative obstacle zone.

According to another example of the present disclosure, the method may further comprise:
  dividing the detected floor zone into a plurality of cells, the detected floor comprising the determined negative obstacle zone;

determining a lateral step, based on the intersection of the pixels classified as floor zone and the pixels classified both as floor zone and negative obstacle zone.

A previously detected floor zone may be used as the input data for the detection of a further lateral step. Generally, a step (whether a lateral or front one) may be considered a group of pixels (normally found, for example, as a line of pixels) wherein an offset or change in the level of the floor surface is found, which may be enough for the user to have to bear in mind while walking normally. Such change in level may usually be similar to, for example, the step of a stair or a similar significant change on the level of the floor.

Furthermore, according to the present disclosure, a step or similar significant change as previously described, may be defined as having an edge, which may be the line dividing the change in floor level, and a step may be further considered a lateral step when the orientation of the edge of the step may not be significantly perpendicular to the direction of the movement of the user. A distinction may be made between a lateral step and a front step, the latter having the edge of the step significantly perpendicular to the direction of the movement of the user.

According to the present disclosure, the detection of a lateral step may be performed by dividing a previously detected floor zone into a plurality of cells, wherein the detected floor zone comprises the determined negative obstacle zone. Then, since the detection of the negative obstacle zone implies that a portion of the detected floor zone may be deeper than what has been previously approximated as a flat floor, the lateral step may be determined by searching for the cells wherein there are at least two adjacent cells, one being detected as a floor zone, and the other one further detected as a negative obstacle zone.

According to another example of the present disclosure, the method may further comprise the steps of:
selecting a frontal zone from the detected floor zone, the frontal zone simulating a space in front of the user and in the advance direction of the user;
obtaining a v-disparity map of the depth parameters of the pixels of the portion of the depth map found within the selected frontal zone;
selecting the values of the v-disparity map higher than a frontal step depth threshold.
based on the selection of the values of the v-disparity map, determining a frontal step floor zone, wherein the frontal step floor zone is determined by selecting the lines corresponding to discontinuities of the obtained v-disparity map.

A previously detected floor zone may be used as the input data for the detection of a further frontal step floor zone. In this case, as previously described, a frontal step may be a step having its edge significantly perpendicular to the direction of the movement of the user. Therefore, a frontal zone to the user is selected, understanding that said zone is within the direction of the movement of the user.

Then, a v-disparity map may be obtained from the portion of the depth map corresponding to said frontal zone. Such v-disparity map, performed for each pixel of the frontal zone of the depth map compared with the rest of the pixels of the same horizontal line of the frontal zone of the depth map, is a way of measuring the most common value of depth parameters within all the frontal zone.

A common way to implement such v-disparity may be in the form of a 2D image, wherein the Y axis represents each horizontal line of the frontal zone, and the X axis represents the depth parameter values. Therefore, each row of the v-disparity map is a histogram of the values of depth that appeared on that row in the depth map. Each of the pixels of a row in the v-disparity will have a value equal to the number of pixels with the same depth in the same row of the depth map. Graphically, the values of the v-disparity with higher value may be shown, for example, whiter than those with a lower value.

In this case, ideally, a floor detection would be graphically represented by a strong white line in the v-disparity map because most of the depths of each row would lay within substantially the same depth.

When all the values of depth parameters of all the pixels within the frontal zone are placed in the v-disparity map, a selection of the more common value of each row may be performed. This selection may represent the values of depth that represents the most common values of the depth map. This way, a clearer (i.e. filtered) version of the v-disparity map is obtained, and the values of the v-disparity map which may be very rare (low accumulation of points in that area of the v-disparity map) or may be errors in the data found on the depth map, may not be taken into account. When a filtered version of the v-disparity map is obtained, it is then possible to locate a discontinuity in between its values. The location of such discontinuity in the Y axis of the v-disparity, may point towards which horizontal line of the original depth map there is a frontal step.

More specifically, according to an example, the selection of the lines corresponding to discontinuities of the obtained v-disparity map may be performed by:
for each line, selecting a plurality of surrounding lines;
comparing the selected value of the disparity map for the line with the values of the v-disparity map of the surrounding lines;
if the comparison is higher than a discontinuity threshold, determining a frontal step floor zone as the zone corresponding to the selected line in the selected frontal zone.

In order to search for discontinuities, a comparison of the most common value (i.e. the selected value) of each line (each value of the Y axis of the v-disparity map) with the lines surrounding itself is performed. This way, for example, beginning from the first line, a comparison may be performed between the depth parameter value of line 1 and the values of lines 1+N (N being a surrounding number of lines nearby line 1). Generically, for any line X, its depth parameter value may be compared with the depth parameter values of lines within the range [X−N, X+N]. When such comparisons result in a difference higher than a discontinuity threshold, a discontinuity may be found, and thus a frontal step floor zone may be determined to be found along line X of the corresponding original frontal zone of the depth map.

Since a frontal step floor zone may be considered a zone perpendicular to the movement direction of the user, the frontal step may be found in a horizontal line of the depth map, therefore being determined by the line X, in this example.

Such examples of the method of detecting an obstacle, resulting in a determination of a frontal step floor zone, may be performed in combination or independently to the previously described methods of detecting obstacles resulting in the segmentation of a portion of the normal map, or resulting in the determination of a negative obstacle floor zone. Therefore, the determination of a frontal step floor zone may be performed on its own, but in combination with the determination of other zones (such as, for example, a negative obstacle floor zone) may enhance an overall detection of different obstacles. For example, the determination of a floor zone, which further comprises the two independently performed determinations of a frontal step floor zone and a negative obstacle floor zone may result in a very accurate assessment of the surroundings of the user, when using a visual aid device such as the one previously described. Therefore, the user may end up having a more detailed information of his surroundings.

According to another example of the present disclosure, the method for detecting obstacles may further comprise the steps of:
  generating a three dimensional virtual map of a predetermined area surrounding the user;
  obtaining a set of virtual coordinates of the user within the virtual map;
  obtaining a set of virtual coordinates of the detected target within the virtual map relative to the virtual coordinates of the user, and the type of detected target from the segmented portion of the normal map;
  storing a tag of the user and a tag of the detected target on the corresponding obtained virtual coordinates of the user and the obtained virtual coordinates of the detected target, within the virtual map;
  verifying if the tag of the detected target is previously stored in the virtual map;
    in case of positive result, verifying if the detected target has been recursively detected;
      in case of positive result, tagging the detected target as non-relevant.

A virtual map may be used to store where all the detected obstacles are found in a surrounding area of the user. This way, the user may be placed within said map using a set of virtual coordinates, and one or more detected targets may also be placed within the virtual map using another set of virtual coordinates, relative to the coordinates of the user. In addition, the type of detected target (floor zone, lateral wall zone or obstacle zone) may also be stored within the virtual map, thus indicating not only a position of an obstacle, but the detected type of said obstacle.

Furthermore, a verification may be performed if the tag of one or more detected targets have been previously stored within the virtual map. In case of positive result, a further verification may be performed if the detected target has been recursively detected. This way, if an obstacle is detected several times (for example, a counter is used for each detection of the same target), or has been detected continuously over a period of time (for example, a timer is used to count the time that the target has been detected in the same place of the virtual map), the detected target is tagged as non-relevant. This way, when a signalling is performed, if a target is considered non-relevant (for example, it is a static object that is repeatedly detected over long periods of time), there is no need to repeatedly signal it to the user, in order to avoid over signalling which may be confusing to the user, or may distract from other important signallings.

Said generation of a virtual map and management of tags corresponding to detected targets may be performed, for example, partially or totally by using a SLAM-type algorithm. Such algorithm is an option used in the robotics field, wherein a robot may keep track of all the elements surrounding itself by generating and keeping an update of them in a virtual map, such as a repository memory.

Such example of the mapping of the surroundings of the user may be performed on its own, regardless of how the previously described obstacle detection methods may have been performed, and still be effective to map and distinguish detected targets as being relevant or non-relevant to a user wearing a visual aid device such as the one previously described in the above examples of obstacle detection methods.

Also, according to a further example, the method for detecting obstacles may further comprise:
  selecting a signalling zone of the virtual map based on the virtual coordinates of the user and the determined orientation of the coordinate system of the distance sensor;
  selecting, within the selected signalling zone of the virtual map, the detected targets that are not marked as non-relevant;
  signalling to the user the selected targets;

Such signalling zone may be a zone which, for example, corresponds to the part of the virtual map which represents the place in reality where the user is looking towards. Therefore, said signalling zone is determined from the virtual coordinates of the user within the virtual map (the map representing the area surrounding the user), and the orientation of the distance sensor, thus determining where the user is looking towards. Said signalling zone may be used to select the detected targets which are relevant to be shown to the user (i.e. selecting the targets not marked as non-relevant), in order to signal them to the user. This way, a repetition of a signalling may be avoided by only selecting the relevant targets for the user.

According to a further example of the present disclosure, the visual aid device may be connected to a repository comprising a three dimensional virtual map of a predetermined area surrounding the user, and the method may further comprise:
  selecting a safety zone of the virtual map, based on the virtual coordinates of the user and the determined orientation of the coordinate system of the distance sensor, the safety zone surrounding the user;
  obtaining a set of virtual coordinates of a previously detected target stored within the virtual map;
  verifying if the obtained set of virtual coordinates of the detected target is not within the selected signalling zone;
    in case of positive result, if the obtained set of virtual coordinates of the detected target is within the safety zone, signalling to the user the detected target;

This way, a safety zone surrounding the user may be determined, the safety zone being comprised in the virtual map. However, said safety zone may be defined taking into the virtual coordinates of the user and the determined orientation of the coordinate system of the distance sensor, that is, the safety zone may be determined by selecting the area surrounding the user which is left out of the field of view of the sensor, but still within a substantially short range of the user. For example, the safety zone may comprise an area surrounding the user wherein the field of view of the distance sensor does not arrive when looking towards said direction. Also, the safety zone may be used in order to signal previously detected targets behind the user and close to it.

This way, if the user looks towards a certain direction, and a previously detected obstacle is within close range of the user in that direction but not covered by the signalling zone, said previously detected target may also be signalled (for example, a chair close to the user but not detected by the user in that moment because the field of view of the distance sensor, although looking forward, does not cover the chair, which may be forward but below).

Also, if a user walks backwards, the previously detected targets which are close to the user may also be signalled (when found within the safety zone), even though they are not found within the signalling zone (because the user may be looking forwards, and therefore the field of view of the distance sensor may point forwards).

Furthermore, the signalling may be performed in different ways. In an example, the signalling may be a visual type signalling. Many different types of visual signalling may be used, comprising colors, brightness of the image, black and white signalling, etc. According to another example, the visual aid device may comprise a display, and the signalling zone may be in the form of a 2D virtual image of the virtual map, based on the virtual coordinates of the user and the determined orientation of the coordinate system of the distance sensor. In this case, the visual signalling may further comprise the steps of:

superimposing a visual signalling on the generated 2D virtual image, of the selected obstacles not marked as non-relevant;

displaying the superimposed 2D virtual image on the display;

This way, while in use, the signalling zone may be formed as a 2D virtual image which may be based on the virtual coordinates of the user and the determined orientation of the coordinate system of the distance sensor. For example, the 2D virtual image may be formed as to substantially match the point of view of the user at that moment, the virtual image being used to display a signaling to the user. Such virtual image may comprise the relevant obstacles the user would be seeing at that moment, and thus a signaling is superimposed on the generated virtual image, the signaling being performed taking into account the users' visual disability. Therefore, for example, if the user has tunnel vision, and a lateral wall is detected on an upper left corner of an obtained normal map, a signaling may be performed in the form of, for example, arrows in the center of the display, pointing towards where the lateral wall is on the portion of the display the user is not able to see (in this example, the upper left corner of the display).

The signalling may also be, for example, a sound type signalling, wherein the detected obstacles are described or signalled by prerecorded voice or other type of sound signals. For example, different sound signals may be used for different types of obstacles, distances of the obstacles or positions of the obstacles relative to the user. Also, the signalling may be, for example, a haptic type signalling, wherein certain detected obstacles may be signalled by means of vibrating devices worn or hold by the user, each vibration describing a type of obstacle or distance and/or position of an obstacle relative to the user. Furthermore, a combination of visual, sound and haptic signalling may also be used, adapting it to the needs of the user.

Furthermore, the signaling may comprise many different types of media, depending on, for example, the users preferences and disabilities, and the type of environment the user is walking through, the signaling being such as colors marking detected zones or obstacles, arrows pointing towards detected zones or obstacles, sound signaling, etc. either for obstacles which are within the range view of the distance sensor and the display at that moment, or for obstacles which are out of said range view.

In general, the use of a virtual map of a predetermined area surrounding the user allows the visual aid device to signal in a more efficient way the detected obstacles to a user.

Such examples of obstacle detection methods resulting in the signalling of detected targets, and the different examples of types of signalling, by using the previously described tagging and mapping of detected targets, may also be used independently and/or regardless of the obstacle detection methods previously described. For example, if different methods are used to detect the obstacles, the previously described method resulting in tagging detected targets as relevant or non-relevant may still be used. The information regarding detected obstacles (which may have been detected different methods as the previously described), can still be used to be stored in a virtual map, tagged, and further signalled using any of the previously described methods above, thus resulting in an efficient and simple signalling of detected obstacles for a user which may be using a visual aid device such as the previously described.

According to another aspect of the present disclosure, a Visual aid device for detecting obstacle elements is presented, the device comprising:

a distance sensor, configured to obtain a normal map;

a communications module, to receive the obtained normal map from the distance sensor and to send the obtained normal map to a computing module, the computing module being configured to perform the previously described method for detecting obstacles.

Such device may comprise any of the previously described different types of distance sensors, such as ToF (Time of Flight) based sensors, Modulated light scanner based sensors, Stereoscopic vision based sensors or Structured light scanners, among others.

Furthermore, the device may communicate either via a wired connection or a wireless communication system to a computing module configured to perform any of the different combinations of methods for detecting obstacles as previously described.

Also, according to another example of the present disclosure, a wearable device may be presented, the wearable device to be worn by a user, in the form of eye glasses, garments, clothing complements, etc. The wearable device may comprise the visual aid device as previously described, wherein the sensor may be mounted on the wearable device. Furthermore, if the wearable device comprises eye glasses, the sensor may be mounted on the eye glasses.

According to a further aspect of the present disclosure, a system for detecting obstacle elements is presented, wherein the system may comprise a visual aid device as previously described, and a computing module configured to perform the previously described method for detecting obstacles in all its variations. Said computing module may be connected to the visual aid device through a cable or in a wireless mode, thus being able to be remotely operated. Furthermore, the computing module may comprise, for example, several sub-modules to perform parts of the method described herein.

Furthermore, according to another aspect, a computer program product is presented which may comprise program instructions for causing a computing system to perform any one or more of the methods for detecting obstacles as previously described. Also, according to other examples, the computer program product may be embodied on a storage medium, or carried on a carrier signal.

DETAILED DESCRIPTION

Figure 1A:
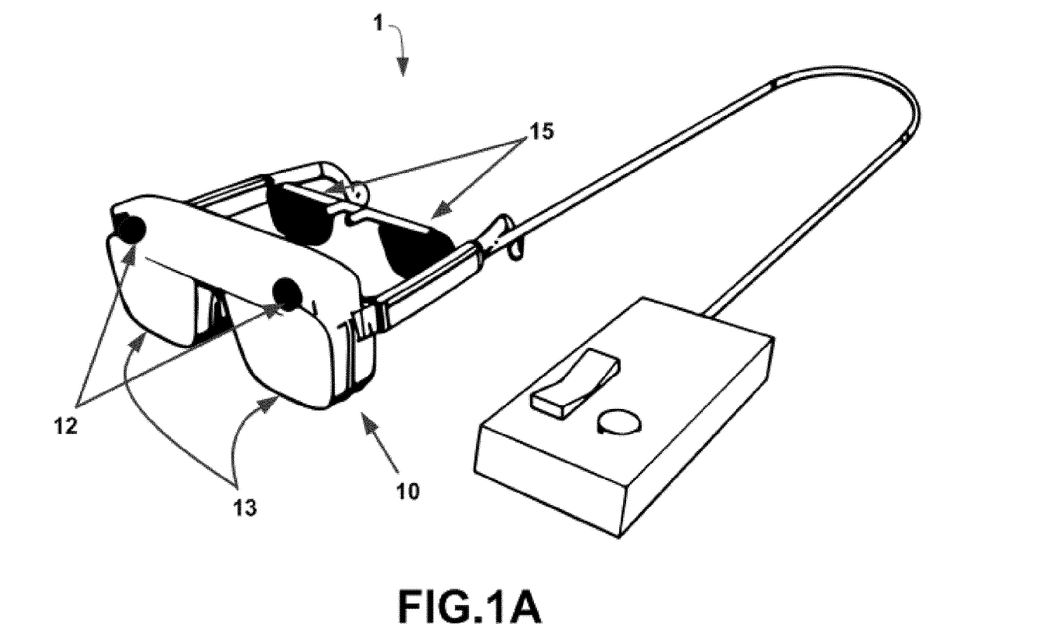
FIGS. 1A and 1B depict an example of a system for detecting obstacle elements comprising a visual aid device according to the present disclosure.
Figure 1B:
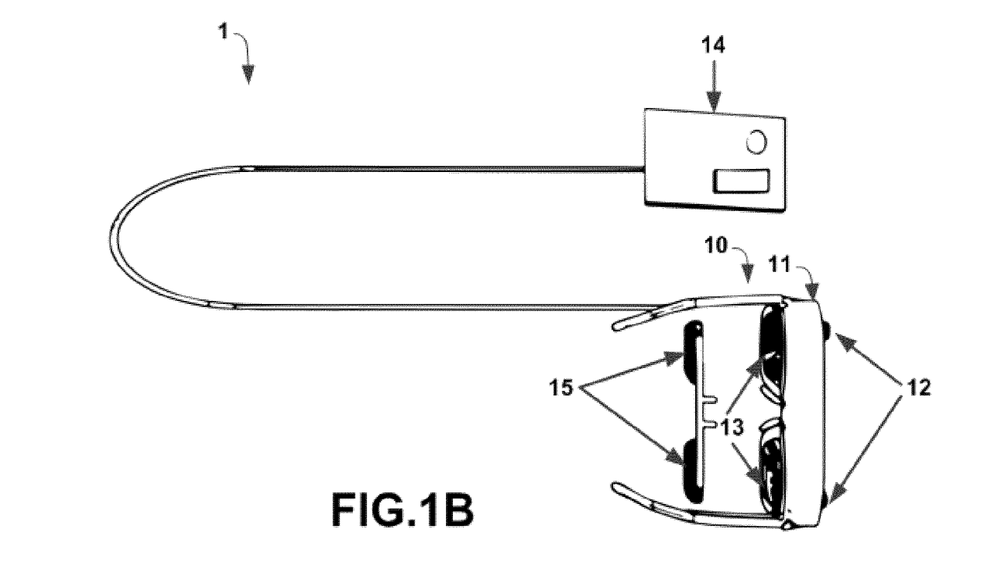

An example of the visual aid device and the system and method for detecting obstacle elements with the visual aid device according to the present disclosure will be described herein through FIGS. 1A and 1B, wherein the system 1 comprises a visual aid device 10 comprising a set of display glasses 11, and a distance sensor in the form of a digital RGB-D stereo camera 12 mounted on the glasses 11. Furthermore, the display glasses comprise a set of lenses 13 which display images to the user while in use. In this example, the camera 12 is mounted on the glasses 11 such that the optical axis of the camera 12 is directed substantially parallel to the optical axis of the lenses 13 of the display glasses 11. This way, the images captured by the camera 12 are substantially similar to the images a user would see through a normal set of glasses, when looking forward. The visual aid device comprises an adapting set of lenses 15, in order to complement the lenses the user already may use in normal life, and the system also comprises a main module 14, connected to the visual aid device 10.

According to this example, the RGB-D stereo camera 12 comprises an in-built functionality which allows capturing two RGB images (i.e. the camera may have, for example, two or more lenses with a separate image sensor for each lens, which allows the camera to simulate human binocular vision) and its corresponding normal map. According to this example, the camera captures depth-based surface normal parameters (forming the normal map). Also, the camera captures a corresponding depth map, from which the normal map can be inferred with geometric methods (for example, calculating the relative depth of neighboring pixels). Therefore, the camera 12 periodically outputs a stereo RGB image, a depth map and a normal map, which is sent to the main module 14 of the system 1. Such module, may be connected to the visual aid device 10 by means of a cable, or via wireless communications.

Figure 2:
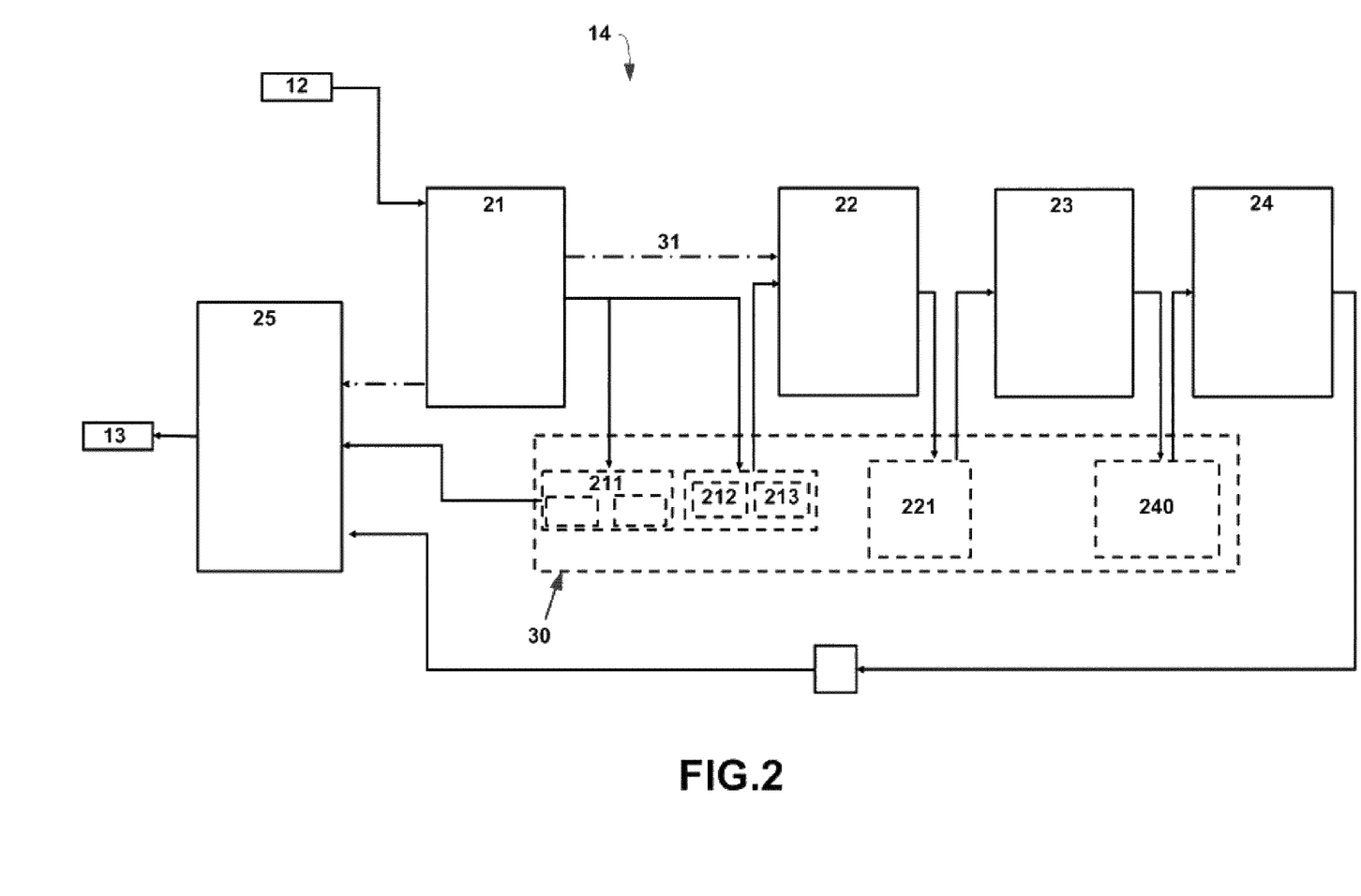
FIG. 2 depicts a diagram block of an example of a main module of a system for detecting obstacle elements according to the present disclosure.

As seen in FIG. 2, the main module 14 comprises a plurality of sub-modules, each sub-module configured to perform several steps of the method according to the present disclosure.

Capturing Module 21

In particular, a first module 21 is a capturing module, which is connected to the stereo camera 12, and receives data from the camera periodically. In this example, the stereo camera 12 sends, for each image capture, a stereo image in the form of an HD RGB image, a depth map and a normal map corresponding to the HD RGB image. The capture module 21 is connected to a memory 30 to store the set of two RGB images (in buffer 211) and the corresponding depth (buffer 212) and normal (buffer 213) maps as matrixes of data. Furthermore, the capture module 21 also generates a synchronism signal 31 to be sent to the next sub-module (a second module 22) in order to synchronize the captured data with further calculations, and to a display module 25, which sends the image and the graphical signalling to the display glasses 13.

Processing Module 22: Detection of Obstacles

The second module 22 is a processing module, which processes the received depth and normal maps in order to detect different types of obstacles. In this example, the output signals of the processing module are the detected type of obstacle, size and the position of the obstacle relative to the world, which is stored in the detection buffer 221 of the memory 30.

After the processing is performed, a detection grid is generated as an output of the processing module 22, which is stored in memory 30 to be further used. The detection grid comprises the dimension of the detected obstacle (or obstacles) and the position of the obstacle relative to the world.

Figure 3:
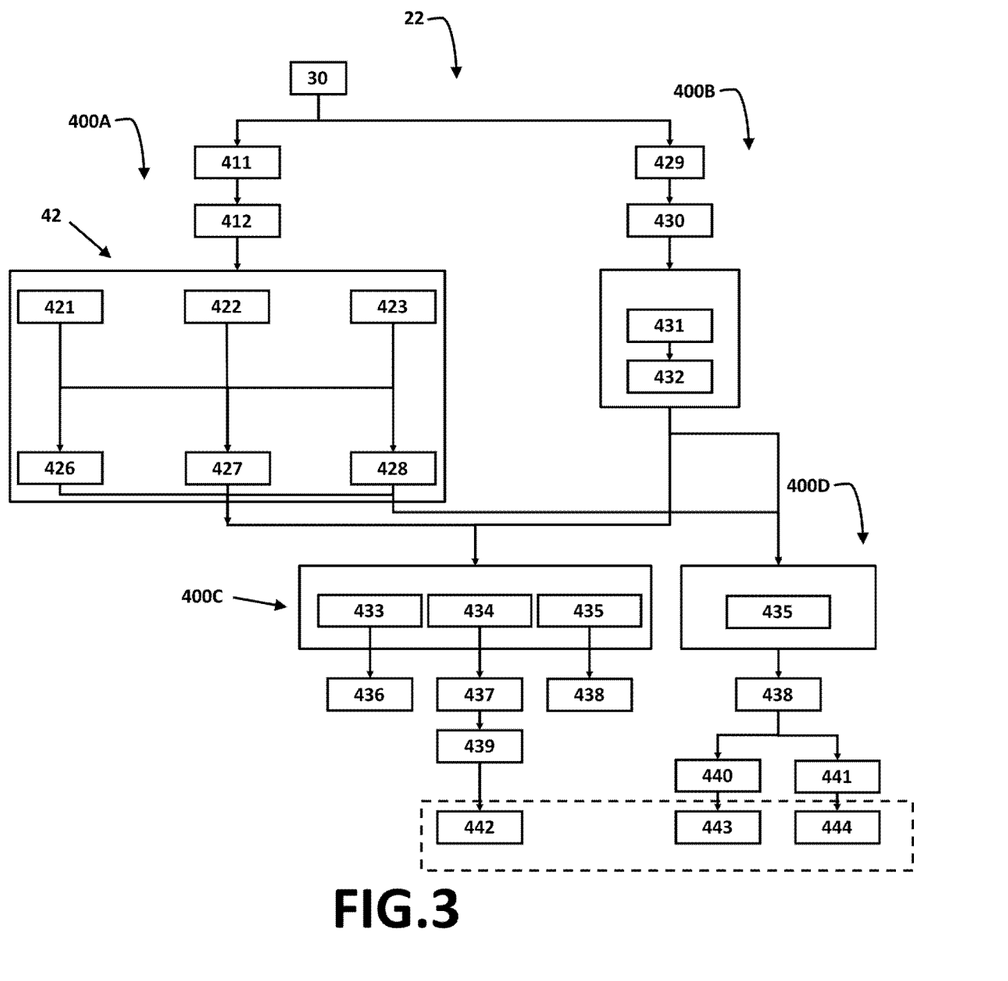
FIG. 3 depicts a diagram block of an example of a processing module of a system for detecting obstacle elements according to the present disclosure.
Figure 5:
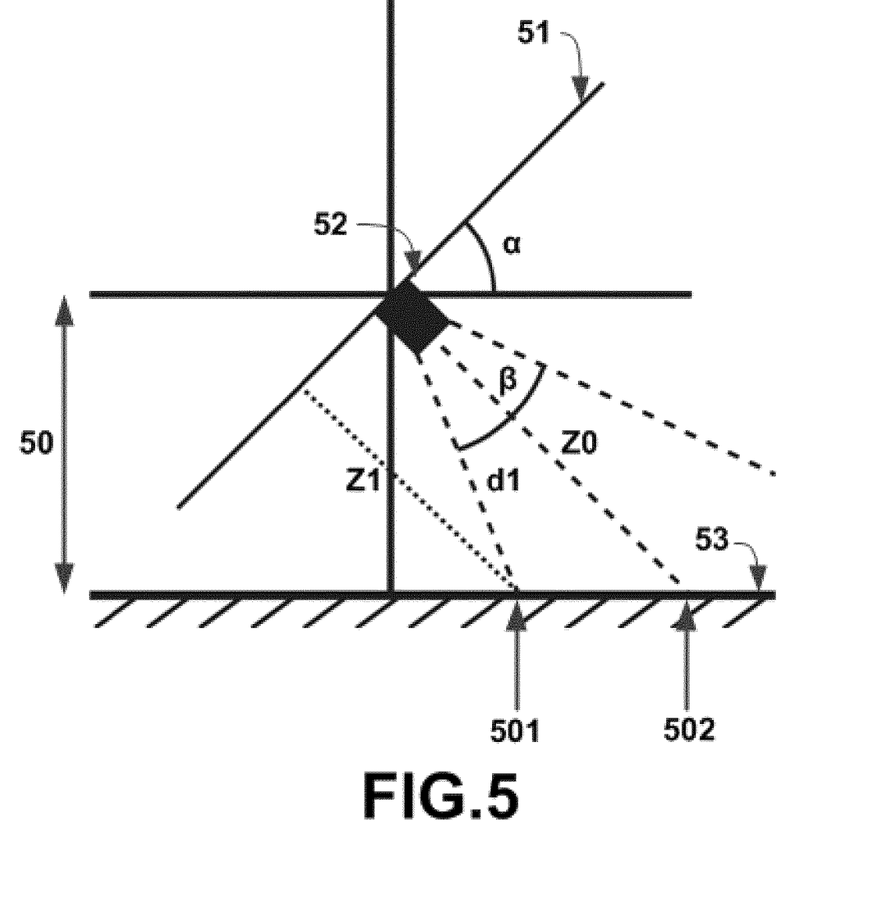
FIG. 5 depicts an example of a calculation of depth thresholds of a distance sensor of a system according to the present disclosure.

More specifically, according to this embodiment, the processing module 22 performs a plurality of different detections of obstacles, which are depicted in FIGS. 3 and 5.

FIG. 3 depicts a general flowchart of the processing module 22. Firstly, the data from the normal map and the depth map is retrieved in parallel in order to perform the detections.

Normal Retrieval 400A

In flowchart 400A, the normal data is retrieved in order to be further used to detect obstacles. The normal map is retrieved from buffer 213 (in block 411), and an orientation correction is performed on the map based on updated data from the IMU (in block 412), considering pitch inclination (the other two components of the IMU, in this example, can be ignored).

When the normal map is received, it comprises, for each pixel, a vector normal to the target surface represented by the pixel, the vector being represented related to the local coordinate system of the camera 12. Thus, in order to be able to use all the normal maps from different captures, to detect the same obstacles, all the received normal maps over time are referred to a common coordinate system (eliminating possible errors introduced by movements of the camera). Therefore, if the camera has moved (i.e. if the user has moved his head) in between the capture of several normal maps, the normal vectors of each capture may be related to different transformations of the camera coordinate system, and such transformation may be corrected by applying an orientation correction. Such orientation correction may be, according to the present example, a rotation matrix to be applied to the received normal map.

According to this specific example, the rotation matrix is generated by obtaining the sensor orientation, comprising a pitch, roll and yaw from an IMU sensor (in this example, the IMU sensor is comprised within the stereo camera 12, but it could be a separate IMU sensor attached to the camera). By using such device, a pitch, roll and yaw is obtained referred to the world coordinate system, which may be used to transform the coordinates of the normal vectors of the corresponding normal map (which are related to the local coordinate system of the camera 12) into normal vectors related to the world coordinate system. The obtaining of the sensor orientation and the normal and depth maps may be synchronised by signal 31, since the orientation should correspond to the normal and depth map which were captured when the orientation was obtained.

After the orientation correction is applied to the normal map, then, a target scene segmentation is performed (block 42), wherein an extraction of the X, Y and Z components of the normal map is performed (blocks 421, 422, 423). Such scene segmentation applies normal thresholds to the normal map in order to segment the normal map as different types of obstacles.

Block 421 extracts the X component of the normal map, which may be relevant for obtaining data about lateral wall type obstacles;

Block 422 extracts the Z component of the normal map, which may be relevant for obtaining data about frontal obstacle type obstacles;

Block 423 extracts the Y component of the normal map, which may be relevant for obtaining data about floor type obstacles;

Afterwards, each extracted component matrix is filtered with a normal threshold:

Block 426 applies a normal threshold corresponding to lateral walls, to its corresponding extracted matrix;

Block 427 applies a normal threshold corresponding to frontal obstacles, to the corresponding extracted matrix; and Block 428 applies a normal threshold corresponding to floors, to the corresponding extracted matrix.

The result is three matrixes, each comprising normal maps which correspond to a lateral wall, a frontal obstacle and a floor zone respectively.

Depth Retrieval 400B

Parallel to the normal retrieval, a depth retrieval is performed in flowchart 400B. In block 429 the depth map is retrieved from buffer 212. Then, the normalised depth map is modified (block 430) in order to apply a reliability threshold (block 431) and a variable threshold (block 432).

The reliability threshold is applied in an upper portion of the depth map, which eliminates depth information that is too far to be relevant for the user. The variable threshold is applied on a remaining lower portion of the depth map.

More specifically, according to the present embodiment, the variable threshold may be determined by applying a predetermined mathematical function which defines the depth thresholds. Such function may be determined by using the height of the user and the pitch component of the camera. There may be different calculations for determining the depth thresholds of each line, which may vary depending on their accuracy.

According to the present embodiment, such variable threshold is applied in order to segment negative obstacle zones, such as holes or substantial irregularities on the floor surface surrounding the user, in order to further signal them to the user through the visual aid device.

More specifically, as previously described, the distance sensor (in this case, the stereo RGB camera) obtains a depth map comprising depth parameters for each pixel. Then, a lower portion of the depth map is selected (assuming that the lower part will comprise at least a plurality of pixels corresponding to targets which are the floor in front of the user). The selected portion is divided into horizontal lines, and a top depth threshold is assigned to the pixels of the top end line, and a bottom depth threshold is assigned to the pixels of the bottom end line. Furthermore, a depth threshold is assigned to the lines in between the top end and bottom end line. The top depth threshold is higher than the bottom depth threshold, and the assigned depth threshold for the pixels of each line between the top and bottom end lines is such that each depth threshold is lower than the depth threshold of the previous line, from the top towards the bottom line.

In this embodiment, the assigning of the thresholds is performed by calculating what it is most likely to be considered the floor, using the height of the user and the pitch component of the camera.

Then, a comparison of the depth parameter of each pixel with the assigned depth threshold of its corresponding horizontal line is performed. If the depth parameter is higher than the depth threshold, it means that said pixel is lower than the floor, i.e. there is a negative obstacle of some type in said pixel.

In order to properly calculate the depth parameters to be compared to the assigned variable thresholds, a calculation may be performed. FIG. 5 shows a diagram of the distance sensor 52 in use, mounted on a visual aid device worn by a user with a height 50 which is standing on a target floor 53. More specifically, the stereo camera 52 has field of view β and an inclination of α (in this example, the user has his head looking downwards), which is the pitch angle of the camera. The camera is a distance sensor, and thus it captures both normal maps and depth maps, which cover the field of view R. In the case of a depth map, the depth parameters for each pixel represent the minimum distance from the plane of the camera 51 to the target depicted. For example, a first target point of the floor 501 is depicted in the depth map obtained by the camera 52 by a depth parameter of value Z1. Also, the centre of the depth map captured by the camera 52 depicts a second target point of the floor 502 which is depicted in the depth map by a depth parameter of value Z0. In the case of Z0, the physical distance between the reference point of the camera and point 502 is the depth parameter itself, but in case of point 501, the real distance between the reference point of the camera and the point 502 is not Z1, but d1. Taking this into account, an expected depth value Z1 (expected if the corresponding target is the floor) of any point of the depth map may be calculated. This way, a comparison may be performed between Z1 (expected depth for a target considered floor) and the real depth (from the depth map) at the same point. This may be achieved by applying the following formulas:

Firstly, a calculation of the distance corresponding to the target depicted on the center of the depth map, which relates to depth parameter Z0.

$$z_0 = \frac{H}{\sin(\alpha)}$$

Then, for any other depth parameter of the depth map is calculated generically by using the following formulas:

$$z_1 = \frac{z_o \cdot tg(a)}{tg(\alpha) + tg(\Delta\beta)}$$

$$z_1 = \frac{H}{\sin(\alpha)} \cdot \frac{tg(a)}{tg(a) + tg(\Delta\beta)}$$

Once z1 is obtained, it is compared with the depth parameter of the same point of Z1 (found in the depth map). If the depth parameter of the same point is higher than the depth of an expected floor (i.e. Z1), a negative obstacle may be found in said point.

The output of 400B is a matrix comprising an adapted depth map taking into account negative obstacles (such as holes) and/or omitting obstacles which are too far to be signalled (through the reliability threshold).

Normal and Depth Data Combination 400C

Once the three matrixes comprising normal data related to lateral walls, frontal obstacles and floors respectively (resulting from 400A), and a matrix comprising a depth map with a reliability and variable threshold applied (resulting from 400B) have been obtained, they are combined in order to segment the normal map taking into account the depth map.

Thus, an AND operator is performed with each of the three normal maps corresponding to lateral walls, frontal obstacles and floors (433, 434, 435) with the adapted depth map, thus segmenting the normal maps within a reliability distance, and making the floor segmentation to detect negative obstacles (such as holes).

This results in three binary matrixes 436, 437 and 438 of pixels classified as lateral walls, frontal obstacles and floor zones.

Afterwards, in block 439, the normal map is divided as a grid with a plurality of cells, the grid representing the trajectory of the user, and in block 442, each obstacle is stored in the grid, with its corresponding size and the position of the obstacle relative to the world in the corresponding cell, within the shared memory 30.

Frontal Step Detection and Lateral Step Detection 400D

According to the present embodiment, the system may also be able to detect lateral and frontal steps. In flowchart 400D, the obtained floor segmentation (blocks 435 and 438) is further used to detect both frontal and lateral steps.

In the case of the detection of frontal steps (block 440), a frontal zone is selected in the area previously detected as floor zone. This is made by selecting a portion of the depth map which is in the lower centre of the map, and also corresponds as a previously detected floor zone.

Figure 6A:
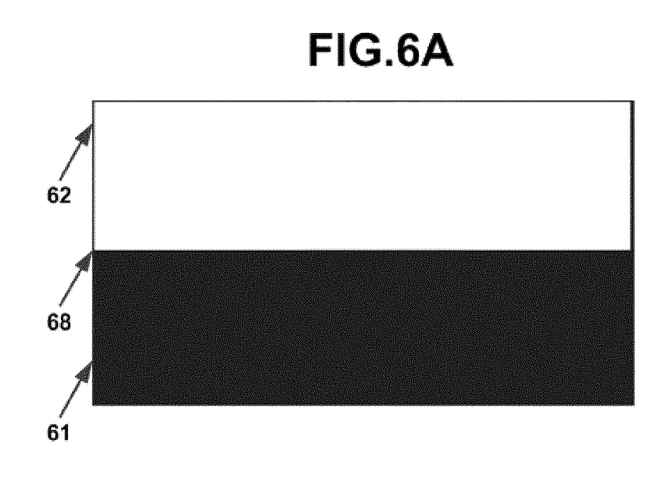
FIGS. 6A and 6B depict examples of a depth map and a disparity map, according to the present disclosure.

Once the frontal zone is selected, a v-disparity map is calculated form the frontal zone. FIG. 6 shows an example of an obtained frontal zone: the lower part 61 corresponds to lines which have a depth parameter X, and the upper part 62 corresponds to lines which have a depth parameter Y. In this example, lines found in part 61 may have a depth X of 40 centimeters, and the ones found in 62 may have depth Y of 10 centimeters. Therefore, a step should be detected in the line dividing the lower part 61 with the upper part 62 (for example, a first step of a staircase going upwards)

Figure 6B:
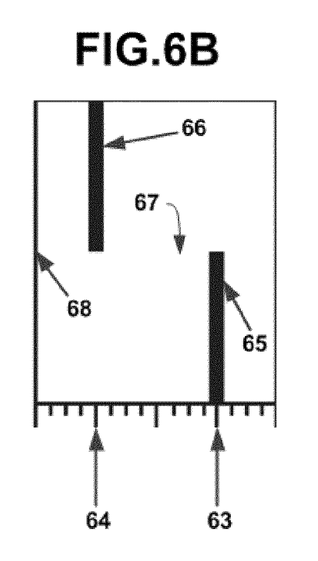

FIG. 6B shows the v-disparity map corresponding to the frontal zone depicted in FIG. 6A, wherein the values of depth are graphed in the X axis, and the values for each line of the frontal zone (from the bottom to the top of the frontal zone) are graphed in the Y axis. As it may be deducted, all values from the lower part 61 have, for each line, accumulated points in depth 40 cm (X axis point 63), and when the values from the frontal zone are depicted in the v-disparity map, they are all found in accumulated points in depth 10 cm (X axis point 64). After a selection of the most common values of the disparity map is performed (that is, a "filtering" of the accumulated points of the disparity map), disparity map lines 65 and 66 are clearly defined. To determine a frontal step floor zone, the system searches for the discontinuity 67 of the values of the disparity map, which is found on line 68. Therefore, a discontinuity is found on line 68 of the frontal zone of FIG. 6A, which is where the previously described frontal step clearly was supposed to be according to this example.

More complex discontinuities may be found in disparity maps of different cases (wherein the frontal zone depicts different targets), but they all may be detected by searching for discontinuities higher than a predetermined discontinuity threshold. Such search may be performed in many different ways which may involve calculations with different levels of complexity.

Furthermore, lateral steps are detected in block 441, by dividing the segmented floor zone into a plurality of cells, and performing a plurality of comparisons in between pixels of adjacent cells. If the difference in between depth parameters of adjacent cells is higher than a lateral step depth threshold, it is determined that there is a lateral step in between said adjacent cells of the depth map.

Once the lateral and frontal steps are detected, in block 443 lateral steps are stored in the grid (formed in block 439), and in block 444 frontal steps are stored in the grid (formed in block 439), both lateral steps and frontal steps being stored with its corresponding size and the position of the steps relative to the world in the corresponding cells, within the shared memory 30.

Mapping Module 23

After the detection of obstacles if performed, a mapping module 23 is used to generate and update a 3D virtual map. The aim of the 3D virtual map is to simulate the behaviour of the user's brain when the user is moving. Therefore, the objective is to inform the user about the obstacles which may be a problem for the user within his trajectory and memorizing those obstacles that are outside the field of view of the user. Also, the mapping module 23 may also manage that a previously signalled obstacle is not constantly shown to the user.

Figure 4:
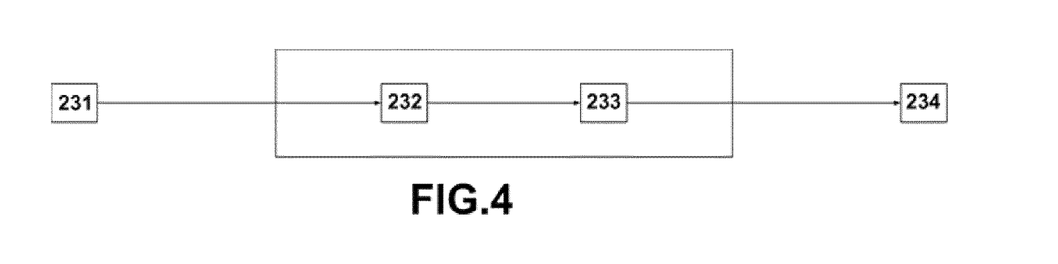
FIG. 4 depicts a diagram block of an example of a mapping module of a system for detecting obstacle elements according to the present disclosure.
Figure 4B:
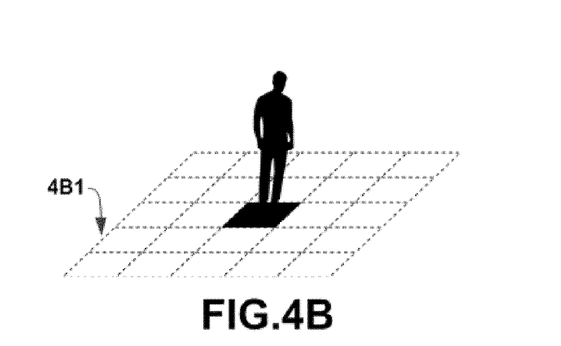
FIGS. 4B, 4C and 4D depict examples of the method performed by the mapping module of FIG. 4, according to the present disclosure.

In this example, as seen in FIG. 4, block 232 receives an input (block 231) in the form of the detection grid 4B1 (FIG. 4B) stored in memory 30, comprising the detected obstacles and the position of the obstacles. Furthermore, it also receives the position of the user and the orientation of the camera 12 (from the IMU of the camera). The position of the user may be, in this example, a position relative to an initialisation position (the virtual coordinates within the virtual map of the user's position when the system was initialised). Regardless of the obtaining process, module 23 receives an updated set of virtual coordinates of the user within the 3D virtual map.

Then, block 232 generates and updates a 3D virtual map of a predetermined area, which will define which obstacles are stored within the map. The dimensions and specifications of the virtual map may be defined based on the needs of each specific user. During the functioning of the device, block 232 generates and updates the 3D virtual map. The 3D virtual map is generated representing a predetermined area surrounding the user. Thus, when a new obstacle is detected, block 232 stores the tag related to the new obstacle (the virtual coordinates of the obstacle relative to the virtual coordinates of the user and the virtual coordinates of the obstacle relative to the initialisation position of the virtual map) within the map. Moreover, block 232 verifies whether or not, the obstacle was in the same position relative to the user before. In case the obstacle occupied the same virtual coordinates relative to the user recursively, the block 232 will tag the obstacle as a non-relevant. Furthermore, the virtual map will be dynamically updated, removing obstacles that were previously in the 3D virtual map but now, due to a change of position of the user, are out of the predetermined area defined by the 3D virtual map surrounding the user.

Figure 4C:
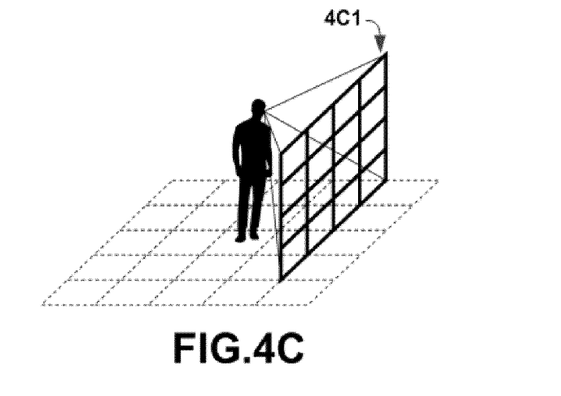

Block 233 generates a 2D projection as the output of mapping module 23. It will signal to the user the obstacles not tagged as non-relevant (i.e. relevant obstacles). In order to do it, block 233 generates a virtual camera which emulates what the user is seeing. The area seen by the virtual camera, i.e. a signaling zone, may be defined based on the user virtual coordinates and orientation of the camera 12. As seen in FIG. 4C, a 2D projection 4C1 of what the virtual camera is seeing is generated by the virtual camera, which captures what is stored on the virtual map on the signaling zone. Therefore, the 2D projection will select and depict the obstacles not tagged as non-relevant from the 3D virtual map.

Additionally, the block 233 signals to the user the obstacles of the virtual map whose virtual coordinates fall within a specified safety zone surrounding the user. A safety zone may be an area surrounding the user, wherein the distance sensor may not detect obstacles due to, for example, the safety zone being out of the field of view of the distance sensor. In order to perform the signalling, block 233 verifies if the virtual coordinates of the detected obstacles are outside the signaling zone, and at the same time, are inside the safety area.

Therefore, as previously described, the obstacles signalled to the user will be obstacles which vary their position relative to the user, and obstacles which its position fall inside the safety zone. This selection of relevant obstacles is performed in order to avoid a continuous signalling of obstacles which the user knows where they are. This method simulates the behaviour of the human brain, wherein when a person is constantly seeing an object in the same position, the person does not constantly think that said object is there. This way, following this criteria, an obstacle that keeps a constant relative distance with the user, and which has been previously signalled the first time it was detected, would not be relevant to the user, because the user acted accordingly when it was first signalled to him.

Figure 4D:
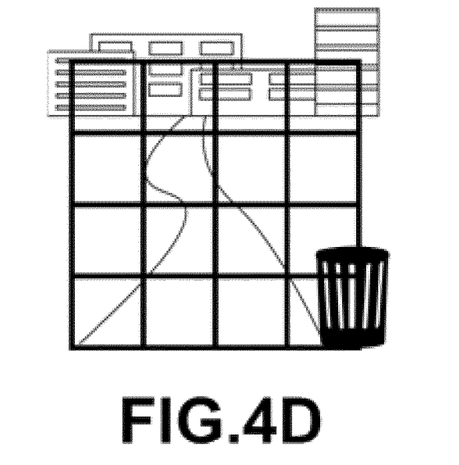

FIG. 4D shows an example of a 2D projection generated in FIG. 4C, wherein several obstacles are selected to be relevant to be shown to the user, taking into account the point of view of the user within the 3D virtual map.

In this example, both the map generation and update of block 232, and the generation of the virtual camera and the 2D projection are performed by using a SLAM-type algorithm.

After the virtual map is generated and filled, the 2D projection is stored within the buffer 240 of the shared memory 30, with each relevant obstacle and its position within the projection.

Signalling Module 24

In this example, a signalling module 24 is used in order to superimpose the stored 2D projection with all its relevant obstacles (as seen in FIG. 4D) with signalling corresponding to each type of obstacle and/or position or distance to the user. The signalling, in this case, may be, for example, different types of colors for each type of obstacle, or signs such as lines, arrows, flashing lights, etc. This may be configurable depending on the users preferences or needs. Furthermore, the 2D projection and the superimposed signalling may also be superimposed to an RGB image corresponding to the detection of all the obstacles, to be further sent to a display module, in order to be sent to the display, which in this case is a set of eye glasses.

The invention claimed is:

1. A method of detecting obstacle elements with a visual aid device relative to a system of world coordinates commonly known as the world coordinate system, the device comprising a distance sensor, the sensor being mounted in a wearable device to be worn by a user, the method comprising:

obtaining a normal map from the distance sensor;
determining the orientation of a coordinate system of the distance sensor relative to the world coordinate system;
applying an orientation correction to the normal map based on the determined orientation, the orientation correction comprising transforming the coordinate system of the distance sensor into the world coordinate system;
comparing the corrected normal map with at least one predetermined normal threshold; and
based on the comparison, segmenting a portion of the normal map as corresponding to a target detected as a lateral wall zone, a floor zone or an obstacle zone.

2. A method according to claim 1, wherein the determining of the orientation of the coordinate system of the distance sensor is performed by obtaining at least a pitch component of the coordinate system of the distance sensor relative to the world coordinate system.

3. A method according to claim 1, wherein the normal map comprises a normal vector for at least one pixel of the normal map, and the orientation correction is a rotation matrix for the normal map.

4. A method according to claim 1, wherein the predetermined normal threshold comprises at least a normal threshold vector corresponding to a lateral wall zone, a floor zone or an obstacle zone.

5. A method according to claim 1, wherein the distance sensor obtains a depth map formed by a plurality of pixels, each pixel comprising a depth parameter, the method further comprising the steps of:

selecting a lower portion of the obtained depth map;
dividing the selected portion of the depth map into a plurality of horizontal lines, the plurality of horizontal lines having a top end line and a bottom end line;
assigning a top depth threshold to the pixels of the top end line, and a bottom depth threshold to the pixels of the bottom end line, the top depth threshold being higher than the bottom depth threshold;
assigning a depth threshold for the pixels of each line between the top and bottom end lines, wherein each depth threshold is lower than the depth threshold of the previous line, from the top towards the bottom line;
comparing the depth parameter of each pixel with the assigned depth threshold of its corresponding horizontal line; and
based on the comparison, further determining a negative obstacle zone in the pixels of the depth map wherein the depth parameter of the pixel is higher than the assigned depth threshold of the pixel.

6. A method according to claim 5, wherein the assigning of the depth threshold for each line between the top and bottom end lines is performed by assigning the values of a predetermined mathematical function, between the top and bottom depth threshold values.

7. A method according to claim 6, wherein the predetermined mathematical function is determined using the height of the user and the pitch component of the coordinate system of the distance sensor relative to the world coordinate system.

8. A method according to claim 5 further comprising the steps of:

dividing the detected floor zone into a plurality of cells, the detected floor comprising a determined negative obstacle zone;
determining a lateral step, based on an intersection of the pixels classified as floor zone and the pixels classified both as floor zone and negative obstacle zone.

9. A method according to claim 5, further comprising the steps of:
- selecting a frontal zone from the detected floor zone, the frontal zone simulating a space in front of the user and in an advance direction of the user;
- obtaining a v-disparity map of the depth parameters of the pixels of the portion of the depth map found within the selected frontal zone;
- Selecting the most common depth value of each row of the v-disparity map;
- based on the selection of the values of the v-disparity map, determining a frontal step floor zone, wherein the frontal step floor zone is determined by selecting the lines corresponding to discontinuities between rows of the obtained v-disparity map.

10. A method according to claim 9, wherein the selection of the lines corresponding to discontinuities of the obtained v-disparity map is performed by:
- for each line, selecting a plurality of surrounding lines;
- comparing the selected value of the v-disparity map for the line with the values of the v-disparity map of the surrounding lines;
- if the comparison is higher than a discontinuity threshold, determining a frontal step floor zone as the zone corresponding to the selected line in the selected frontal zone.

11. A method according to claim 1, the method further comprising the steps of:
- generating a three dimensional virtual map of a predetermined area surrounding the user;
- obtaining a set of virtual coordinates of the user within the virtual map;
- obtaining a set of virtual coordinates of the detected target within the virtual map relative to the virtual coordinates of the user, and the type of detected target from the segmented portion of the normal map;
- storing a tag of the user and a tag of the detected target on the corresponding obtained virtual coordinates of the user and the obtained virtual coordinates of the detected target, within the virtual map;
- verifying if the tag of the detected target is previously stored in the virtual map;
  - in case of positive result, verifying if the detected target has been recursively detected;
    - in case of positive result, tagging the detected target as non-relevant.

12. A method according to claim 11, wherein the steps of claim 11 are performed by using a SLAM-type algorithm.

13. A method according to claim 11, further comprising:
- selecting a signalling zone of the virtual map based on the virtual coordinates of the user and the determined orientation of the coordinate system of the distance sensor;
- selecting, within the selected signalling zone of the virtual map, the detected targets that are not marked as non-relevant;
- signalling to the user the selected targets.

14. A method according to claim 13, wherein the visual aid device is connected to a repository comprising a three dimensional virtual map of a predetermined area surrounding the user, the method further comprising:
- selecting a safety zone of the virtual map, based on the virtual coordinates of the user and the determined orientation of the coordinate system of the distance sensor, the safety zone surrounding the user;
- obtaining a set of virtual coordinates of a previously detected target stored within the virtual map;
- verifying if the obtained set of virtual coordinates of the detected target is not within the selected signalling zone;
  - in case of positive result, if the obtained set of virtual coordinates of the detected target is within the safety zone, signalling to the user the detected target.

15. A method according to claim 14, wherein the signalling is at least one of a visual type signalling, a sound type signalling and a haptic type signalling.

16. A method according to claim 15, wherein the visual aid device comprises a display, and wherein the signalling zone comprises a 2D virtual image of the virtual map, based on the virtual coordinates of the user and the determined orientation of the coordinate system of the distance sensor, the visual signalling comprising the steps of:
- superimposing a visual signalling on the generated 2D virtual image, of the selected obstacles not marked as non-relevant;
- displaying the superimposed 2D virtual image on the display.

17. A visual aid device for detecting obstacle elements, comprising:
- a distance sensor, configured to obtain a normal map;
- a communications module, to receive the obtained normal map from the distance sensor and to send the obtained normal map to a computing module, the computing module being configured to perform the method of claim 1.

18. A wearable device to be worn by a user, comprising the visual aid device according to claim 17, wherein the distance sensor is mounted on the wearable device.

19. A wearable device of claim 18, wherein the wearable device comprises eye glasses and the sensor is mounted on the eye glasses.

20. A system for detecting obstacle elements, the system comprising a visual aid device for detecting obstacle elements, comprising:
- a distance sensor, configured to obtain a normal map;
- a communications module, to receive the obtained normal map from the distance sensor and to send the obtained normal map to a computing module configured to perform the method of claim 1.

* * * * *